(12) United States Patent
Fourcade et al.

(10) Patent No.: US 8,793,994 B2
(45) Date of Patent: Aug. 5, 2014

(54) HYDRAULIC BRAKE BOOSTER DEVICE

(75) Inventors: Jean Fourcade, Laille (FR); Philippe Richard, Chelles (FR); Olivier Castello, Bondy (FR)

(73) Assignee: Robert Bosch GmbH, Stuttgart (DE)

( * ) Notice: Subject to any disclaimer, the term of this patent is extended or adjusted under 35 U.S.C. 154(b) by 735 days.

(21) Appl. No.: 13/054,717

(22) PCT Filed: Jul. 15, 2009

(86) PCT No.: PCT/EP2009/059078
§ 371 (c)(1),
(2), (4) Date: Jan. 18, 2011

(87) PCT Pub. No.: WO2010/007101
PCT Pub. Date: Jan. 21, 2010

(65) Prior Publication Data
US 2011/0126535 A1 Jun. 2, 2011

(30) Foreign Application Priority Data

Jul. 17, 2008 (FR) ...................................... 08 04082

(51) Int. Cl.
*B60T 13/00* (2006.01)
*B60T 11/20* (2006.01)
(52) U.S. Cl.
USPC ............................ 60/547.2; 60/547.3; 60/562
(58) Field of Classification Search
USPC .......... 60/547.1, 547.2, 547.3, 562; 192/85.6, 192/85.63
See application file for complete search history.

(56) References Cited

U.S. PATENT DOCUMENTS

| 3,768,608 | A | * | 10/1973 | Fulmer | ........................ | 188/170 |
| 4,371,002 | A | * | 2/1983 | Tischer | ...................... | 137/625.3 |
| 4,819,996 | A | * | 4/1989 | Belart et al. | ................ | 303/114.3 |
| 4,905,535 | A | * | 3/1990 | Ludwig et al. | .................. | 74/468 |
| 2005/0241305 | A1 | * | 11/2005 | McClain et al. | ............. | 60/547.1 |
| 2006/0230758 | A1 | * | 10/2006 | Tagata et al. | ................ | 60/547.1 |

FOREIGN PATENT DOCUMENTS

| DE | 3209337 | 9/1983 |
| DE | 3502473 | 7/1986 |
| DE | 3502474 | 7/1986 |
| DE | 4338906 | 5/1995 |

OTHER PUBLICATIONS

PCT/EP2009/059078 International Search Report and Written Opinion.

* cited by examiner

*Primary Examiner* — Edward Look
*Assistant Examiner* — Daniel Collins
(74) *Attorney, Agent, or Firm* — Michael Best & Friedrich LLP

(57) ABSTRACT

In order to address a problem with the effectiveness of a brake booster device, provision is made for the latter to be produced in the form of hydraulic servo control. In such an instance, a master cylinder (7-10) of a braking circuit (3-4) is provided with a pressure chamber (19) upstream of the braking circuit. This pressure chamber is then subjected to an injection (28) of hydraulic fluid by a pump (34). The pump is operated (39) according to the braking requirements. The servo control comprises a set of moving gear (54) sensitive to these requirements and that work an injection valve (29-30).

12 Claims, 2 Drawing Sheets

HYDRAULIC BRAKE BOOSTER DEVICE

BACKGROUND OF THE INVENTION

The present invention relates to a hydraulic brake booster device. Such a device is more particularly intended to be installed in a vehicle, notably a vehicle of the sedan or utility type. It is an object of the invention to address problems with technological evolutions, requirements for space and manufacturing complexity.

In the automotive field, brake booster devices, notably of the pneumatic or electrohydraulic type, are known. The first pneumatic booster devices in practice comprise a pneumatic servo brake, provided with a variable-volume front chamber separated from a rear chamber, which is likewise a variable-volume chamber, by a partition formed by a leaktight and flexible diaphragm and by a rigid skirt plate. The rigid plate drives a pneumatic piston which, via a push rod, bears against a primary piston of a master cylinder of a hydraulic braking circuit, typically a tandem master cylinder. The front chamber positioned on the master cylinder side is connected pneumatically to a source of fluid. The rear chamber, on the opposite side to the front chamber, is placed on the brake pedal side and is connected pneumatically, in a way controlled by a valve, to a source of driving fluid typically air at atmospheric pressure. At rest, that is to say where a driver is not depressing the brake pedal, the front and rear chambers are connected to one another while the rear chamber is isolated from atmospheric pressure. Under braking, the front chamber is first of all isolated from the rear chamber, then air is admitted into the rear chamber. This admission of air has the effect of driving the partition and of pneumatically boosting the braking.

The disadvantage displayed by this type of pneumatic boosting lies in the volumetric ratio of the boost force. Specifically, because the boost force is provided by air at ambient pressure, which is not very high, the booster has to be large enough in size that the boost force will be great. When, for reasons of space, it is not possible to produce chambers with sufficiently large volumes, provision may be made for a number of chambers to be produced in a cascade configuration. Such embodiments are, however, always to the detriment of the space available in the engine compartment of the vehicle.

Further, these devices by way of vacuum source for the front chamber, use a vacuum established in an engine inlet manifold. Now, with modern-day engines, the amount of air admitted is smaller, and the vacuum source becomes less effective. With diesel engine vehicles, acting in this way is not even conceivable.

Also known are electrohydraulic brake booster devices. Typically, an electric motor is connected to a hydraulic pump which injects a hydraulic fluid under pressure into the braking circuits, downstream of the master cylinder, at the time that these circuits are called into action. Control over this electric motor is achieved via measurements of the pressures obtaining in the front and rear chambers of the pneumatic servo brake. Such a solution presents numerous disadvantages.

First, the boost pumps used therefore have to be high-pressure pumps, capable of a constant delivery. In practice, they have to be driven by high-powered motors, typically having a power of 1 kilowatt. Even for a vehicle with a powerful combustion engine, developing 100 kilowatts for example, this brake boosting alone represents 1% of the power developed by the engine, and this is too much.

Technologically, the pumps supply a high pressure. An orifice plate interposed in a return circuit leading to the reservoir, controlled on the basis of the pressure measurements, allows a hydraulic liquid to be injected under variable pressure into the brake circuit. The opening and closing of the orifice plate also present problems of noise and problems associated with the difficulties associated with accurate control.

SUMMARY OF THE INVENTION

The invention seeks to solve these problems of space, power consumption, and difficulties of precise control by using an entirely novel design of brake boosting circuit. The brake boosting circuit of the invention can also be coupled, although this is not compulsory, to an pneumatic boosting circuit or even to an electrohydraulic boosting circuit.

The principle of the invention involves adding a hydraulic servo brake or regulator which is interposed between the inlet to the master cylinder and the bearing point of the control rod transmitting the forces applied by the driver to a brake pedal. This hydraulic regulator behaves in the same way as a pneumatic servo brake. The pressure of the driver's foot on the brake pedal mechanically causes a hydraulic circuit of the master cylinder to be placed in communication with the hydraulic boost circuit driven by the pump, preferably an electric pump.

The regulator for this purpose comprises an interposed intermediate cylinder with which a contiguous cylinder is juxtaposed. A set of moving gears is interposed in this contiguous cylinder and divides it into two chambers. This set of moving gears is mechanically sensitive to a difference in pressure produced in a first chamber of the contiguous cylinder, by the action of the foot on the brake pedal, and a pressure produced in a second chamber of the contiguous cylinder by the injection of the hydraulic flow from the pump. As soon as the pressure produced by the foot increases, it pushes back the set of moving gears and hydraulic fluid under high pressure is injected into the second chamber of the contiguous cylinder.

A piston passes through two chambers of the intermediate cylinder. It has the special feature of having a cross section in the second chamber that is greater than its cross section in the first chamber. The action of the pump is then additionally applied in the second chamber to the difference in surface area of this piston. This piston therefore presses against a primary piston of a master cylinder, or even drives the primary and secondary pistons of a tandem master cylinder. When the driver takes his foot off the brake pedal, a valve that places the hydraulic pump in communication with the chambers of the contiguous cylinder closes, and the pressures in the regulator naturally drop because of the communication with the hydraulic reservoir.

A subject of the invention is therefore a hydraulic brake booster device comprising a master cylinder provided with a primary chamber and with a primary piston incidentally moved by a control rod, characterized in that the device comprises a hydraulic regulator interposed between a bearing point of the control rod and a bearing point on the primary piston.

For preference, the hydraulic regulator, or servo brake, comprises an interposed cylinder, interposed between a bearing point for the control rod and the primary cylinder, an extension piston bearing against the primary piston and interposed, in the interposed cylinder, between the bearing point of the control rod and the primary piston, this extension piston defining in the interposed cylinder an upstream chamber close to the control rod and a downstream chamber close to the primary piston, the extension piston having a surface of larger cross section in the downstream chamber than the one in the upstream chamber, a cylinder contiguous with the interposed cylinder, a shell, positioned in the contiguous cylinder and forming, in the contiguous cylinder, a rear chamber and a front chamber, the upstream and downstream chambers of the interposed cylinder being in communication with the rear chamber and the front chamber of the contiguous cylinder respectively, a set of moving gears positioned in the shell, a valve operated by the set of moving gears, a communication for placing a hydraulic source in communication with the front chamber via the valve.

BRIEF DESCRIPTION OF THE DRAWINGS

The invention will be better understood from reading the description which follows and from studying the accompanying figures. These figures are given only by way of entirely nonlimiting example of the invention. The figures show.

DETAILED DESCRIPTION

Figure 1:
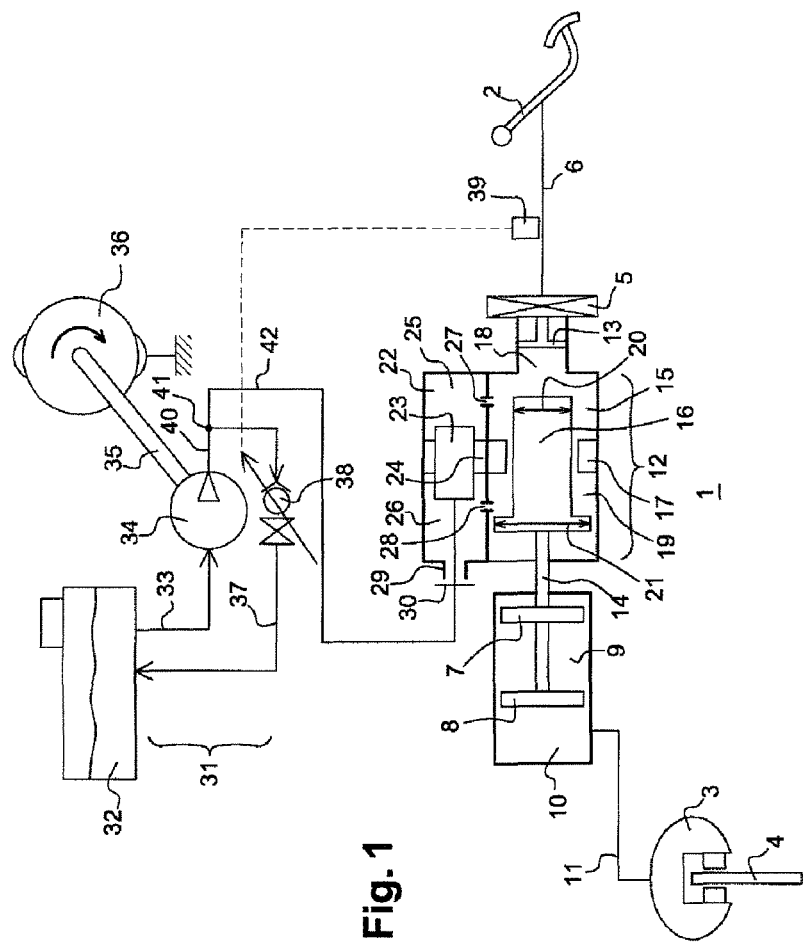
FIG. 1: a schematic depiction of a master cylinder according to the invention.

FIG. 1 is a schematic depiction of a hydraulic brake booster device 1 according to the invention. This device 1 is used in a vehicle, not depicted, to transmit a braking force applied by a driver's foot to a brake pedal 2 to a braking device 3, typically a disk brake caliper acting on a disk 4 of a wheel of the vehicle. The device 1 may be boosted by an optional pneumatic brake booster device 5. The force applied to the pedal 2 is thus transmitted from a control rod 6, in this instance the pedal 2, to a primary piston 7, or even preferably also to a secondary piston 8 of a tandem master cylinder. The chambers such as 9 and 10 of this master cylinder are connected by hydraulic lines such as 11 to braking devices such as 3 mounted, via independent hydraulic circuits, on the various wheels of the vehicle.

According to the invention, the device 1 comprises a hydraulic regulator 12 interposed between a bearing point 13 of the control rod 6 and a bearing point at the inlet 14 to the master cylinder. The invention preferably covers an overall device, which therefore comprises the actual master cylinder proper and the regulator 12, because for preference these two components may be formed from one and the same block of metal which has been machined from a casting. It is, however, conceivable for these two items to be manufactured separately and joined together by conventional means.

The regulator servo brake 12 is thus formed of an interposed cylinder 15 which is interposed and aligned between the bearing point 13 and the bearing point 14. Inside this interposed cylinder 15 there moves an extension piston 16. This piston 16 slides in the cylinder 15 with the aid of a ring 17 which defines within the interposed cylinder two chambers: an upstream chamber 18 close to the control rod 6 and a downstream chamber 19 close to the primary piston 7. One of the special features of the extension piston 16 is that it has two elements with cross-sectional surface areas 20 and 21 respectively in these chambers which are of different sizes. The cross section 21 is greater than the cross section 20. In practice, the extension piston 16 cannot therefore pass through the ring 17 because the cross section 21 is greater than the cross section 20 which itself corresponds to the inside of the ring 17.

In addition to the interposed cylinder 15, the regulator of the invention comprises a contiguous cylinder 22, contiguous with the cylinder 15. For numerous reasons, all these cylinders are preferably circular. A shuttle 23 moves inside the contiguous cylinder 22. The shuttle 23 slides in a ring 24 bearing against the walls of the contiguous cylinder 22 so as to define therein a rear chamber 25 and a front chamber 26. The rear chamber 25 is in communication with the upstream chamber 18 while the front chamber 26 is in communication with the downstream chamber 19. They are in communication via communications 27 and 28 respectively. The various upstream, downstream and front, rear chambers are filled with hydraulic fluid by an ancillary device. In practice, seals mounted notably in the rings 17 and 24 prevent fluidic communications between the upstream and downstream chambers and between the front and rear chambers.

The front chamber 26 comprises a valve 29, here symbolic, depicted in the form of a check valve 30. The valve 29-30 serves to place a source 31 of hydraulic pressure in communication with the front chamber 26. The source 31 in the conventional way comprises a hydraulic fluid reservoir 32 opening via a line 33 into a constant-delivery pump 34 driven by a shaft 35 in turn driven by a motor 36, preferably an electric motor. On the outlet side of the pump 34, a return circuit 37 returns the hydraulic fluid, pumped from the reservoir 32, to this same reservoir 32. This return circuit is fitted with a controlled valve 38. The valve 38 is controlled, in a conventional way, by a detector 39 that measures the action on the brake pedal 2 and/or the control rod 6.

The way in which this hydraulic source 31 works is known, and is as follows. When the pedal 2 is operated, the detector 39 closes the valve 38 a little. This being the case, the pump 34, which produces a constant delivery, experiences an increase in pressure in an outlet line 40 leading to the valve 38. This increased pressure is tapped by a tapping 41 to be applied to the valve 29-30 of the contiguous cylinder of the regulator 12 of the invention. The greater the extent to which the pedal is depressed, the greater the increase in pressure in the pipe 42 leading from the tapping 41 to the valve 29-30.

The principle of the invention is as follows. When the user depresses the pedal 2, because of the reaction of the pistons 7 and 8 of the master cylinder, the hydraulic fluid pressure in the upstream chamber 18 increases. It therefore also increases accordingly in the rear chamber 25 because of the communication 27. This being the case, the shuttle 23 moves and opens the valve 30, such that the front chamber 26 of the contiguous cylinder 22 now finds itself subjected to a high pressure transmitted by the line 42. This high pressure obtaining in the front chamber 26 is transmitted via the communication 28 to the downstream chamber 19.

The extension piston 16 is then, via the difference in surface area between the cross section 20 and the cross section 21, subjected to a high boost pressure supplied by the pump 34. This being the case, the extension piston 16, which bears 14 against the primary piston 7 of the master cylinder, applies to the latter a greater, boosted, force, causing better braking of the brake disk 4.

Figure 2:
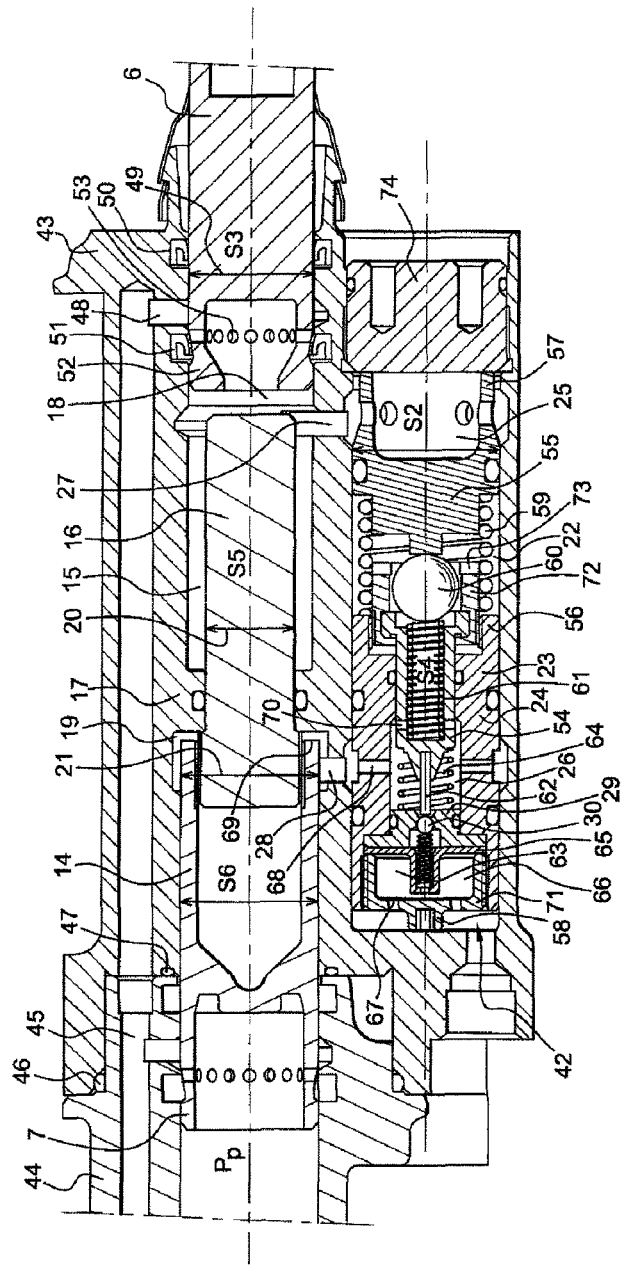
FIG. 2: a detailed depiction of the hydraulic regulator of the invention.

FIG. 2 reconsiders the same elements in detail and leads to a practical embodiment of the schematic device shown in FIG. 1. It shows various other features of the device of the invention. First, the master cylinder comprising a regulator can be produced either in a single operation or produced using two components: a doubly cylindrical first component 43 that forms the actual regulator proper, as shown in FIG. 2, and a conventional component 44 that forms the master cylinder. The component 43 comprises a block pierced with the interposed cylinder 15 and with the contiguous cylinder 22. Hydraulic fluid is distributed both to the master cylinder 44 and to the regulator 43 by a bore 45 aligned with each of these two components and leading to the reservoir 32. Where they are joined together, the two components 43 and 44 are fitted with seals such as 46, to prevent leaks. The bore 45, in its portion that enters the component 43, terminates at one end in a communication 48 via which the hydraulic fluid can enter the intermediate cylinder 15.

The intermediate cylinder 15 has, between the location of the ring 17 and the inlet via which the control rod 6 enters, a bore with a cross section 49 which is somewhere between the cross section 20 and the cross section 21. For example, in this bore 49, near the point of introduction of the rod 6, a set of O-ring seals such as 50 and 51 allow the upstream chamber 18 to be filled with hydraulic fluid, without external leakage, when the rod 6 is in the retreated position. Furthermore, these seals allow the pressure in the upstream chamber 18 to rise when this rod 6 is depressed, by preventing fluid from returning back to the reservoir 32.

For this purpose, the control rod 6 is equipped at its end introduced into the interposed cylinder 15 with a bell housing 52 provided with peripheral openings 53 which, when the control rod 6 is in the rest position, lie facing the opening 48. In this rest position, the seal 50 prevents the hydraulic fluid from traveling back along the rod 6. As soon as the control rod 6 is depressed and the location of the openings 53 moves beyond the seal 51, the latter prevents the hydraulic fluid trapped in the chamber 18 from traveling back toward the reservoir 32. This being the case, the pressure in the chamber 18 increases.

This increase has two effects: first, the extension piston 16 receiving this pressure on its cross section 20 is driven and via its end 7 which acts as the primary piston of the master cylinder, applies the pressure necessary for braking. Second, because the pressure in the chamber 18 has increased, it causes fluid to pass into the communication 27 between this upstream chamber 18 and the rear chamber 25 of the contiguous cylinder 22. The shuttle 23 itself has two special features: firstly it is deformable and secondly it drives a set of hollow moving gear 54. The shuttle 23 is thus made up of a mount 55 able to move globally past the communication 27 and of a fixed shell 56, globally facing the communication 28.

The mount 55 rests against a closed end of the rear chamber 25 via a pedestal 57, while the shell 56 rests against the roof of the front chamber 26 via a stop 58. A coil spring 59 keeps the mount 55 and the shell 56 apart. The mount 55 can run in the chamber 25, moving closer to the shell 56. The mount 55 also bears against a ball 60 which, by reaction, presses against a coil spring 61 contained in the set of moving gears 54. The set of moving gears 54 is provided at an opposite end to the one that accepts the ball with a post 62 intended to press against a ball that forms the shutter 30 of the valve 29. The ball 30 is held against the seat of the valve 29 by a spring 63 which bears against a structure of the shell 56.

FIG. 2 shows the start of a demand for boosted braking. For example, the rod 6 has already been inserted slightly into the interposed cylinder 15 and the openings 53 are just about to move beyond the O-ring seal 51. When they have moved beyond it, the upstream chamber 18 will be closed off When it is closed off, continued pressure on the control rod 6 will cause the mount 55 resting against the closed end of the rear chamber 25 to move away therefrom because of the increase in pressure in the chambers 18 and 25. The mount 55 will then press against the ball 60. Initially, the ball 60 will push back the spring 61 with no further effect. After a certain travel has been covered, which is as short as possible in order to avoid excessive dead travel of the pedal 2, the ball 60 will come to bear cleanly against an edge of the set of moving gears 54.

Because of this clean bearing, firstly, the set of hollow moving gears 54 is closed off. Secondly, the advancing travel of the mount 55 causes the set of moving gears 54, and notably its post 62, to move toward the ball 30. The set of moving gear itself is normally pushed back toward the mount 55 by a spring 64 bearing against a body of the shell 56. The shell 56 is a hollow piston provided with a fixed dividing partition 65. This fixed partition 65 acts as a seat for the valve 29. This fixed partition 65 divides the hollow shell 56 into two parts: a first part that forms the front chamber 26 and a second part that forms an access chamber 66 in communication, via communications such as 67, with the line 42.

When the post 62 presses against the ball 30, this ball allows the pressure produced by the pump 34 (FIG. 1) to enter and progress as far as the chamber 26. The chamber 26 is formed firstly by the hollow part of the shell 56 and secondly by an annular space with which it communicates via holes such as 68 in the wall of the shell 56. This annular space is itself in communication with the downstream chamber 19 via the communication 28.

The advancing travel of the rod 6 has therefore caused the mount 55 to advance, has caused the set of moving gears 54 to advance, has opened the valve 29 and has placed the chamber 19 under pressure using the pressure of the liquid supplied by the line 42. This being the case, the extension piston 16 finds itself subjected, via a peripheral annulus 69, to the additional pressure applied by the pump 34. This additional pressure causes the piston 16 to move toward the master cylinder, to the left in FIG. 2.

This being the case, for a given position of the control rod 6 (supposed to be kept fixed in a braking position), the upstream chamber 18 sees its volume increase because the extension piston 16 escapes toward the master cylinder under the effect of the hydraulic boost. This being the case, the pressure in this upstream chamber 18 drops, leading to the drop in pressure in the rear chamber 25. As the pressure in the chamber 25 drops, the mount 55 retreats as, ultimately do the ball 60 and the set of moving gears 54. This being the case, the valve 29 closes by the ball 30 returning to bear against its seat 65. By acting in this way, servo control of position has been achieved. If the rod 6 is moved forward again a little, the same phenomenon recurs, the shell compresses and the mount 55 moves forward until the advancing travel of the extension piston 16 is enough to return them to equilibrium.

Upon brake release, control of the valve 38 leads to a drop in pressure in the line 42. At the same time, the situation is one in which the pressure in the downstream chamber 26 is higher than the pressure present in the access chamber 66. In order to discharge this additional pressure, the set of moving gears 54, of hollow tubular shape and containing the spring 61 at its center, is provided with a set of peripheral holes such as 70. For example, four peripheral holes lead from the chamber 26 into the bore of the set of moving gears 54. The high pressure available in the chamber 26 can thus escape as far as the chamber 25 where it contributes to allowing the mount 55 to return against the end wall of the chamber 25 because also the ball 60 is no longer blocking off the hollow part of the set of moving gears 54. The intermediate chamber between the mount 55 and the shell 56 is also placed in communication, by means which have not been depicted, with the reservoir 31 via a line of the same type as the bore 45. At rest, the pressure between the mount 55 and the shell 56 is therefore equalized with the pressure in the chambers 25 and 26.

From an industrial standpoint, the interposed cylinder 15 is mounted in the precise continuation of the cylinder of the master cylinder. In this way, the extension piston can quite simply be formed of an extension screwed into a support 14 of the master cylinder piston.

In order to mount the set of moving gears 54 and the shell 56 in the contiguous cylinder 22, the procedure followed is this: first, the ball 30 is placed on the seat 65 and the spring 63 is mounted on top of the ball 30 and held there by a cover. Next, the spring 64 is fitted into the chamber 26. The seat and cover assembly is then mounted in the closed end of the shell 56 where it is held in position by a screw-on cap 71. This cap 71 comprises the stops 58. Next, the set of moving gears 54 is slipped into the ring 24 formed in the shell 56. Next, the spring 61 is mounted in the bore of the set of moving gear 54 before the ball 60 is placed on top. When the ball 60 is in place, a retaining ring 72, surmounted by a washer 73, is screwed from the other side of the shell 56 to prevent the set of moving gear 54 from escaping. This set of moving gears nonetheless maintains its mobility, notably under the effect of the spring 64. Next, the spring 59 is fitted around the ring 72 and the washer 73. Next, the mount 55 is slipped into position with its end intended to press against the ball 60 in the spring 59. That assembly is then mounted inside the contiguous cylinder 22 which is plugged by a screw-on end piece 74. The assembly thus produced is then ready for use. For its part, an element of the extension piston 16 is screwed onto another element that forms the primary piston 7 before being fitted into the ring 17, present in the interposed cylinder 15.

The relationship between the input force Fe bearing against the rod 6 and the pressure Pp in the primary chamber of the master cylinder is $Fe=Pp \times (S4 \times S3 \times S6/(S2 \times (S6-S5)+S4 \times S5))$.

The modulated pressure Pm available in the chamber 26 is then equal to $Pm=Pp \times ((S2 \times S6/(S2 \times (S6-S5)+S4 \times S5))$, neglecting the forces of the various springs. In one example, the diameters of the various circular cross sections S2 to S6 are 27.6 mm, 20.6 mm, 10 mm, 15 mm and 23.8 mm, respectively. These dimensions, with an applied force of 53 daN, and with a maximum pressure delivered by the pump of 123 000 HPa, lead to an additional pressure in the boost chamber of 80 000 HPa, namely a considerable boost force of around 560 daN.

Choosing a DC motor 36 with which to drive the pump 34, in which motor the torque available is proportional to the current, is a preferred solution because the transfer function is simple. Further, a DC motor, also known as a torque motor, has the advantage of being very well able to withstand blocking. For example, the pump may then be of the lifting and forcing type (without reverse leakage). Nonetheless, it could also be of the peristaltic, diaphragm or vane type or, more generally, of a positive-displacement type. The last three types do not cause the motor to stop when the pressure in the chamber 6 reaches the desired value. With the device of the invention, it even becomes possible to stop the pump. Specifically, once braking is over, there is no longer any need to continue to run the motor 36, hence saving energy.

The invention claimed is:

1. A hydraulic brake booster device comprising a master cylinder provided with a primary chamber (9) and with a primary piston (7) incidentally moved by a control rod (6) and a hydraulic boost source, characterized in that the device comprises a hydraulic regulator (12) interposed between a bearing point (13) of the control rod and a bearing point (14) on the primary piston, the hydraulic regulator comprising:

an interposed cylinder (15), interposed between the bearing point for the control rod and a primary cylinder;

an extension piston (16) bearing against the primary piston and interposed, in the interposed cylinder, between the bearing point of the control rod and the primary piston, the extension piston defining in the interposed cylinder an upstream chamber (18) close to the control rod and a downstream chamber (19) close to the primary piston, the extension piston having a surface (21) of larger cross section in the downstream chamber than a surface (20) in the upstream chamber;

a contiguous cylinder (22) contiguous with the interposed cylinder;

a deformable shuttle (23) which comprises a mount and a shell which are separated from one another by a spring and which shuttle is positioned in the contiguous cylinder forming a rear chamber (25) and a front chamber (26), the upstream and downstream chambers of the interposed cylinder being in communication (27, 28) with the rear chamber and the front chamber of the contiguous cylinder respectively;

a valve (29, 30) operated by the shuttle; and a communication (41) for placing a hydraulic source (31) in communication with the front chamber via the valve;

wherein the shuttle comprises a set of moving gears, able to move in the shell, and capable of working the valve.

2. A device according to claim 1, characterized in that the interposed cylinder is common with the primary cylinder.

3. A device according to claim 1, characterized in that the device comprises a secondary cylinder and a secondary piston to form a tandem master cylinder.

4. A device according to claim 1, characterized in that the set of moving gears is hollow and comprises an opening (70) to communicate with a reservoir.

5. A device according to claim 1, characterized in that the interposed cylinder is common and continuous with the primary cylinder.

6. A device according to claim 1, characterized in that the interposed cylinder is continuous with the primary cylinder.

7. A device according to claim 2, characterized in that the device comprises a secondary cylinder and a secondary piston to form a tandem master cylinder.

8. A device according to claim 5, characterized in that the device comprises a secondary cylinder and a secondary piston to form a tandem master cylinder.

9. A device according to claim 6, characterized in that the device comprises a secondary cylinder and a secondary piston to form a tandem master cylinder.

10. A device according to claim 1, characterized in that the interposed cylinder is spaced from the primary cylinder.

11. A device according to claim 1, characterized in that the bearing point (14) extends between the interposed cylinder and the primary cylinder.

12. A device according to claim 1, characterized in that the surface (21) of the interposed cylinder facing the primary chamber has a larger cross-sectional diameter than the surface (20) opposite end of the interposed cylinder facing the control rod (6).

* * * * *